(12) United States Patent
Nakashima et al.

(10) Patent No.: US 7,896,321 B2
(45) Date of Patent: Mar. 1, 2011

(54) SPRING FORCE ADJUSTING DEVICE FOR A HYDRAULIC SHOCK ABSORBER

(75) Inventors: Yuji Nakashima, Tokyo (JP); Masaru Mishima, Tokyo (JP); Nobumichi Hanawa, Tokyo (JP); Yasuhiro Kitamura, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 1198 days.

(21) Appl. No.: 11/523,086

(22) Filed: Sep. 19, 2006

(65) Prior Publication Data

US 2007/0062770 A1 Mar. 22, 2007

(30) Foreign Application Priority Data

Sep. 20, 2005 (JP) ............................... 2005-271588
Nov. 29, 2005 (JP) ............................... 2005-344051

(51) Int. Cl.
*B60G 15/06* (2006.01)
(52) U.S. Cl. ...................................... 267/221; 267/175
(58) Field of Classification Search ............ 188/322.12, 188/321.11; 267/218, 234, 235, 255, 221, 267/179, 177, 175, 174
See application file for complete search history.

(56) References Cited

U.S. PATENT DOCUMENTS

| | | | | | |
|---|---|---|---|---|---|
| 2,697,600 | A | * | 12/1954 | Gregoire | ...................... 267/287 |
| 2,756,045 | A | * | 7/1956 | Raymond | ..................... 267/218 |
| 3,618,927 | A | * | 11/1971 | Nicholls | ....................... 267/48 |
| 4,079,922 | A | * | 3/1978 | Nicholls | ..................... 267/218 |
| 4,183,509 | A | | 1/1980 | Nishikawa et al. | |
| 4,348,016 | A | * | 9/1982 | Milly | ........................... 267/177 |
| 4,418,800 | A | * | 12/1983 | Hess | ........................... 188/195 |
| 5,116,016 | A | * | 5/1992 | Nagata | ........................ 248/578 |
| 5,454,550 | A | * | 10/1995 | Christopherson | ............ 267/221 |
| 5,722,645 | A | * | 3/1998 | Reitter | ........................ 267/177 |
| 6,155,545 | A | * | 12/2000 | Noro et al. | ................... 267/221 |
| 6,827,184 | B1 | * | 12/2004 | Lin | ......................... 188/321.11 |
| 6,857,625 | B2 | * | 2/2005 | Loser et al. | .................. 267/175 |

FOREIGN PATENT DOCUMENTS

| | | |
|---|---|---|
| DE | 958 531 C | 2/1957 |
| JP | 56 109937 A | 8/1981 |
| JP | 08-210414 | 8/1996 |
| JP | 08-210417 | 8/1996 |
| JP | 08-270712 | 10/1996 |
| JP | 10-281207 | 10/1998 |
| TW | 329465 | 4/1998 |
| TW | 375215 | 11/1999 |
| TW | 409802 | 10/2000 |
| TW | 468603 | 12/2001 |

* cited by examiner

*Primary Examiner*—Bradley T King
*Assistant Examiner*—Thomas Irvin
(74) *Attorney, Agent, or Firm*—Rabin & Berdo, PC

(57) ABSTRACT

A spring force adjusting device for a hydraulic shock absorber includes a cover (13) having a tubular shape, which is arranged on an outer side of a rod (12), a suspension spring (2) arranged on outer peripheries of a cylinder (11) and the cover (13), a cam mechanism (3) which adjusts a spring force, which is arranged on the outer periphery of the cover (13), a top cap (5) mounted on a tip of the rod (12), a junction member (4) sandwiched between the top cap (5) and the cover (13), and a means for preventing relative rotations of the top cap (5), the cover (13), and the junction member (4).

6 Claims, 6 Drawing Sheets

SPRING FORCE ADJUSTING DEVICE FOR A HYDRAULIC SHOCK ABSORBER

BACKGROUND OF THE INVENTION

Field of the Invention

This invention relates to a spring force adjusting device for a suspension spring of a hydraulic shock absorber.

Spring force adjusting devices capable of adjusting by using a cam mechanism a spring force of a suspension spring of a hydraulic shock absorber for use in a vehicle, in particular, a two wheeler or the like are known as those disclosed in the documents of JP 08-210414 A and JP 08-210417 A.

Each of those spring force adjusting devices is provided with the cam mechanism which is mounted on an outer periphery of a cylinder of the hydraulic shock absorber. A rod protruding from the cylinder is exposed to the outside, so the rod is susceptible to damage.

Meanwhile, JP 08-270712 A discloses a cam mechanism mounted on a side of a rod protruding from a cylinder. In this case also, the rod is exposed to the outside.

According to a hydraulic shock absorber as disclosed in the document of JP 10-281207 A, a cam mechanism is mounted on the side of a rod while a cover is put over both the cam mechanism and the rod. Thus, while the rod and the cam mechanism are protected to a sufficient degree, the cam mechanism exists inside the cover, so an operability of the cam mechanism at a time of adjusting the spring force is low.

SUMMARY OF THE INVENTION

It is an object of this invention to provide a spring force adjusting device for a hydraulic shock absorber, capable of reliably protecting a rod from being damaged without loss of an operability of a cam mechanism.

To achieve the above-mentioned object, this invention provides a spring force adjusting device for a hydraulic shock absorber, which include, a cylinder, a rod protruding from the cylinder so as to be free to extend and retract, a tube-shaped cover provided on an outside of the rod and having an inner diameter larger than an outer diameter of the cylinder, a suspension spring arranged on outer peripheries of the cylinder and the cover, a cam mechanism arranged on the outer periphery of the cover to adjust a spring force of the suspension spring, the cam mechanism supporting one end of the suspension spring, being rotatable with respect to the cover, being engaged with the cover in an axial direction, and moving the one end of the suspension spring vertically according to a rotating position of the cam mechanism, a top cap mounted on a tip of the rod and having a diameter smaller than a diameter of the cover, a junction member sandwiched between the top cap and the cover and arranged so as to be attachable and detachable in a direction orthogonal to the rod, and means for preventing relative rotations of the top cap, the cover, and the junction member.

BRIEF DESCRIPTION OF THE DRAWINGS

FIGS. 7A and 7B are views in which: FIG. 7A is an exploded view of another embodiment; and FIG. 7B is a side view of a part thereof.

DETAILED DESCRIPTION OF THE PREFERRED EMBODIMENT

Hereinafter, an embodiment of this invention will be described with reference to the drawings. This embodiment describes a case where a spring force adjusting device of this invention is applied to a hydraulic shock absorber which supports a rear wheel of a motorcycle.

Figure 1:
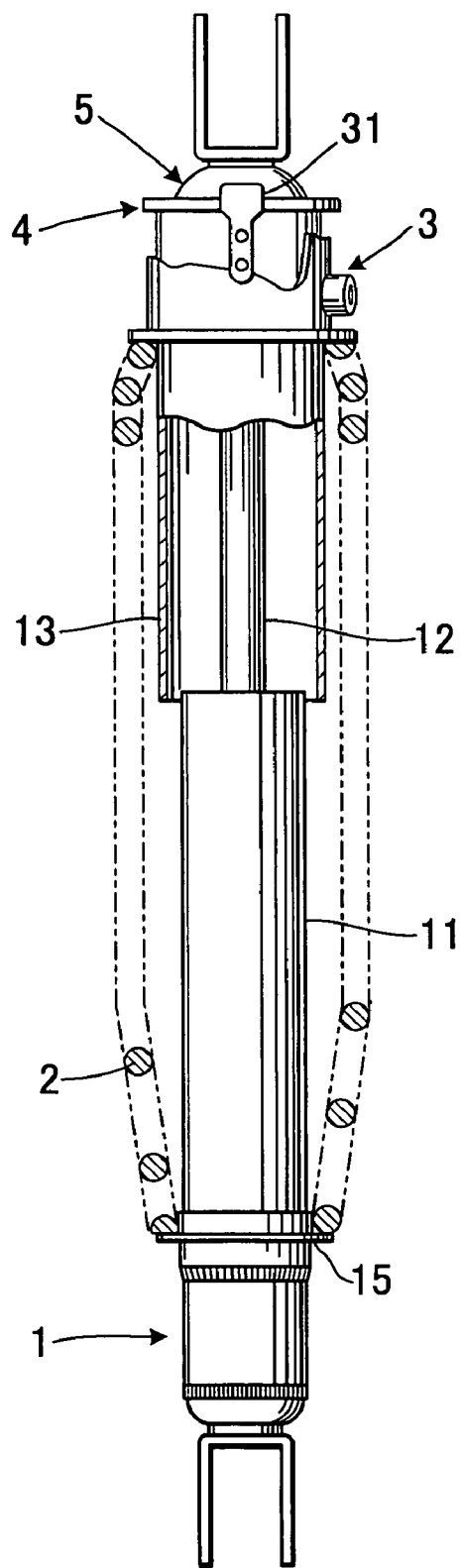
FIG. 1 is a front view of a hydraulic shock absorber to which a spring force adjusting device according to this invention is applied.

The hydraulic shock absorber is provided with, as shown in FIG. 1, a suspension spring 2 arranged on an outer periphery of a shock absorber main body 1. The hydraulic shock absorber is further provided with a cam mechanism 3 which adjusts a spring force of the suspension spring 2.

The shock absorber main body 1 includes a cylinder 11 and a rod 12 capable of axially extending from/retracting into the cylinder 11. A lower end of the cylinder 11 is connected to a wheel (not shown) and an upper end of the rod 12 is connected to a vehicle body (not shown).

A periphery of a portion of the rod 12, which is exposed to the outside, is covered with a tubular cover 13. The cover 13 is connected to the rod 12 so as to be detachable therefrom as described later. The cover 13 has a diameter larger than that of the cylinder 11 and a length which is enough to entirely cover the rod 12 even when the rod 12 is operated fully to extend. When the rod 12 retracts, the cover 13 overlaps therewith from the outside of the cylinder 11.

The suspension spring 2 is supported at a lower end thereof by a spring seat 15 mounted on the outer periphery of the cylinder 11 and is supported at an upper end thereof by a spring seat 32b of the cam mechanism 3. Accordingly, by operating the cam mechanism 3 to vertically move the spring seat 32b, a compression amount of the suspension spring 2 changes, thereby making it possible to adjust the spring force.

Figure 2:
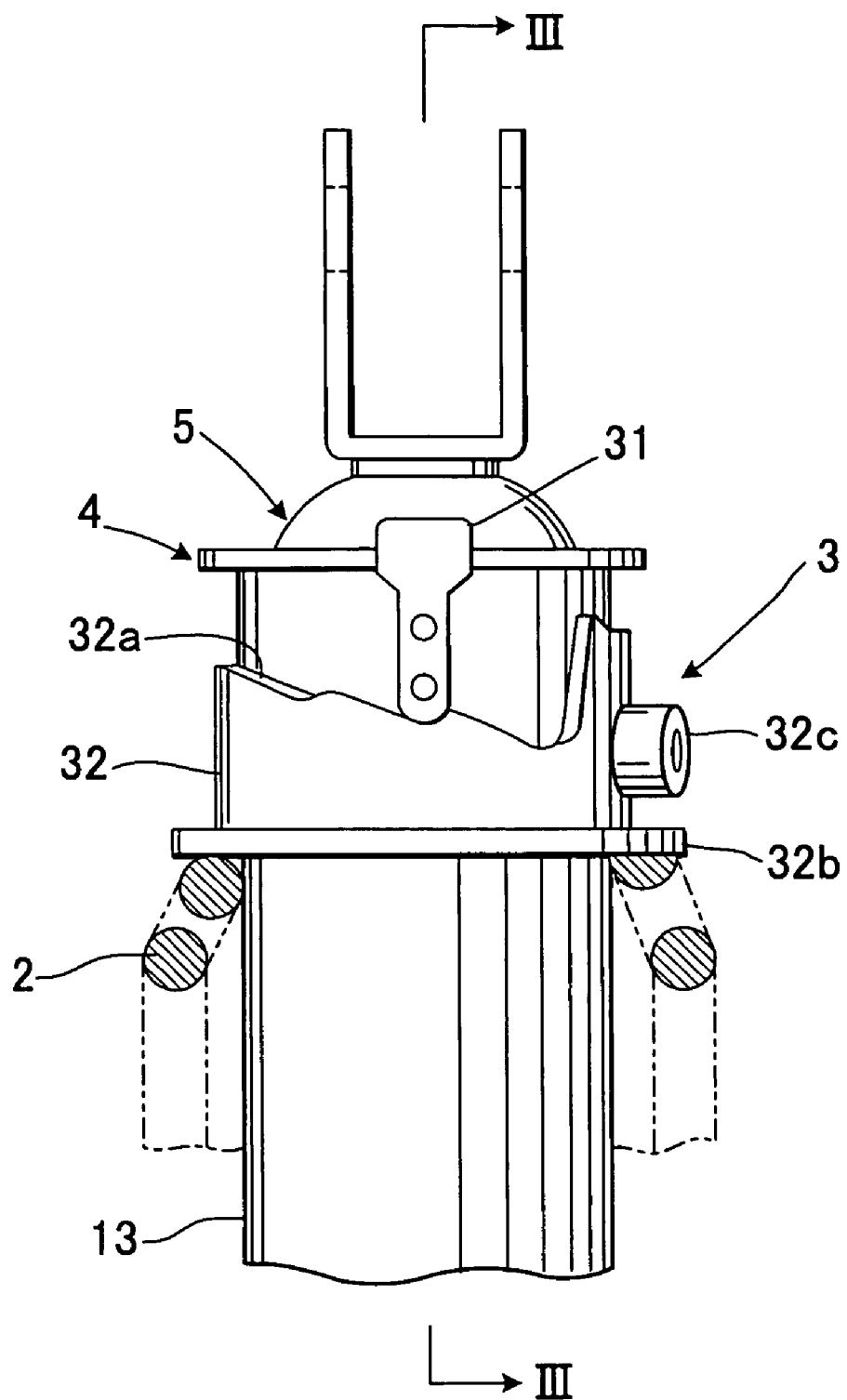
FIG. 2 is a partially enlarged front view of an upper end portion of the hydraulic shock absorber of FIG. 1.
Figure 3:
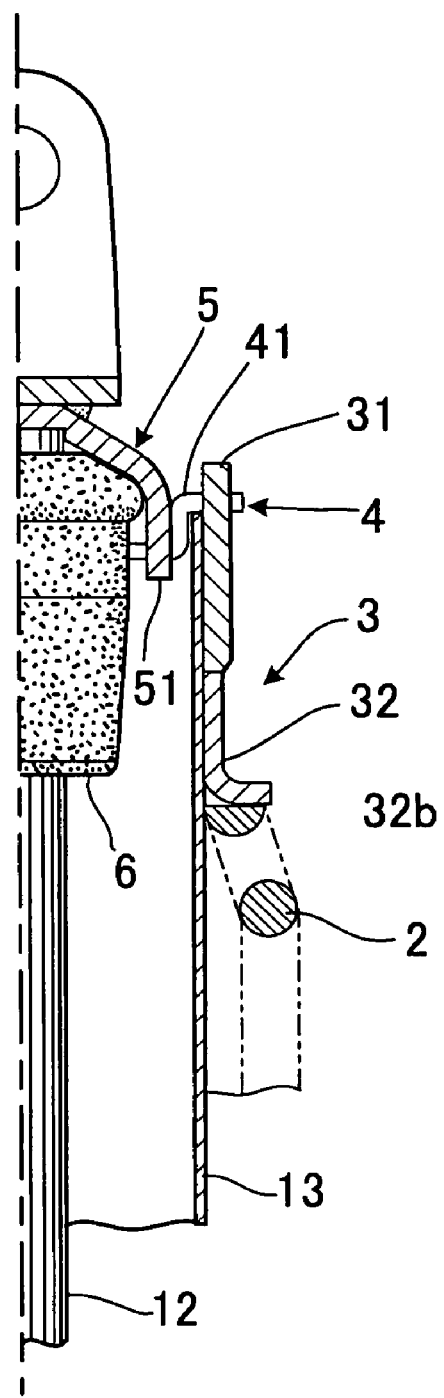
FIG. 3 is a sectional view taken along the line III-III of FIG. 2.
Figure 4:
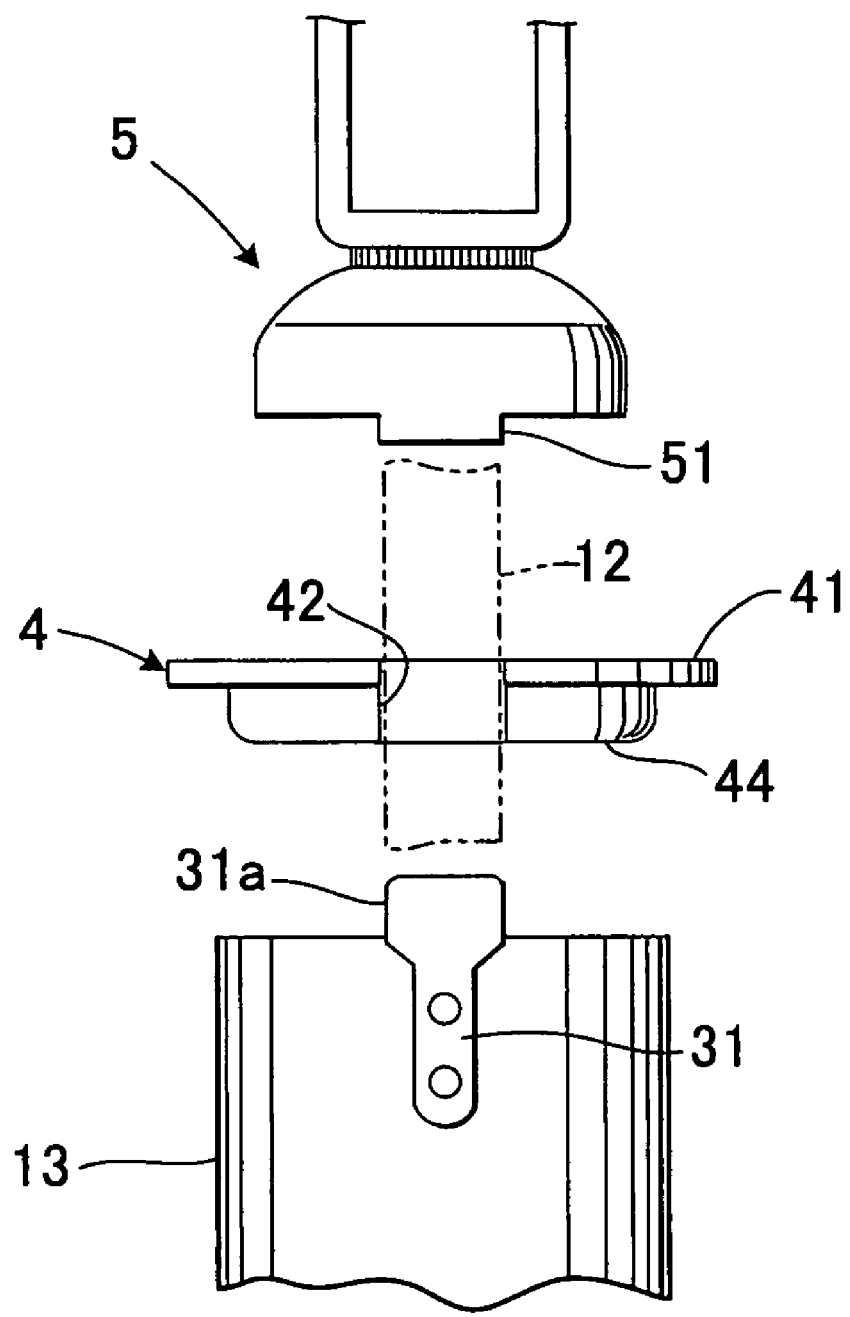
FIG. 4 is an exploded view of the upper end portion of the hydraulic shock absorber.

As shown in FIGS. 2 through 4, a junction member 4 is placed on an upper portion of the cover 13 and a top cap 5 which is mounted to a tip of the rod 12 is arranged on an upper portion of the junction member 4.

The cam mechanism 3 includes, as shown in FIGS. 2 and 3, a cam barrel 32 introduced onto an outer periphery of the cover 13 so as to be rotatable, and a stopper 31 fixed to an upper portion of the cover 13 by welding or the like.

A cam surface 32a is formed on an upper end of the cam barrel 32. As shown in FIG. 2, the cam surface 32a includes three portions of different heights. An apical tip of the stopper 31 abuts on the cam surface 32a.

The cam barrel 32 has, at a lower end thereof, the spring seat 32b formed in a flange-like fashion. The spring seat 32b supports the upper end of the suspension spring 2.

On the outer periphery of the cam barrel 32, a tool insertion portion 32c is provided. When a tool is inserted into the tool insertion portion 32c and the cam barrel 32 is rotated, an engagement position of the stopper 31 with respect to the cam surface 32a changes, thereby changing a height position of the cam barrel 32 with respect to the cover 13.

As a result, the upper end of the suspension spring 2 is vertically moved, thereby changing the compression amount of the suspension spring 2, making it possible to freely adjust the spring force of the suspension spring 2 to be increased or reduced.

Next, a description will be made of a relationship among the cover 13, the junction member 4, and the top cap 5.

FIG. 4 shows the top cap 5, the junction member 4, and the cover 13 in a state where they are separated.

As shown in FIGS. 2 and 3, the top cap 5 is fixed to the tip of the rod 12 by welding or the like. It should be noted that, being positioned inside the top cap 5, a cushioning rubber 6 is mounted to the rod 12. When the rod 12 retracts into the cylinder 11 to a maximum degree, the cushioning rubber 6 abuts on the upper end of the cylinder 11 to absorb an impact.

Between the top cap 5 and the cover 13, the shallow tubular junction member 4 is sandwiched. The junction member 4 includes a bottom portion 44 having, at a center thereof, a through-hole 43 through which the cushioning rubber 6 is passed and a flange portion 41 extending radially outwardly from a tube portion of the junction member 4.

An outer diameter of the top cap 5 is smaller than an inner diameter of the junction member 4. A lower end of the top cap 5 is allowed to abut on a bottom portion 44 of the junction member 4. Further, an inner diameter of the cover 13 is larger than an outer diameter of the tube portion of the junction member 4. An upper end of the cover 13 is allowed to abut on the flange portion 41 of the junction member 4.

The spring force of the suspension spring 2 acts on the cover 13 through an intermediation of the cam mechanism 3, thereby allowing the junction member 4 to be pushed upwards to abut on the top cap 5. In this manner, the junction member 4 is supported while being sandwiched between the cover 13 and the top cap 5.

Figure 5:
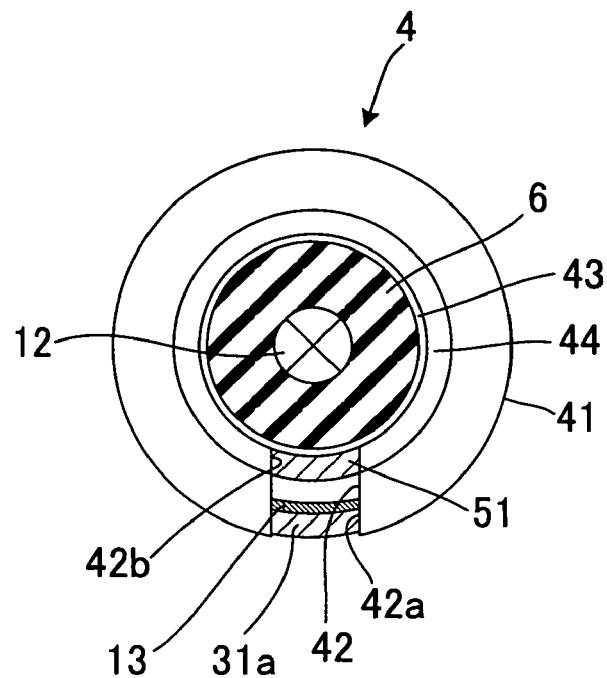
FIG. 5 is a plan view showing a junction member of the hydraulic shock absorber.

In order to remove the junction member 4 from between the cover 13 and the top cap 5 as described later, the junction member 4 has, as shown in FIG. 5, a dividing slot 42 cut in a radial direction from the flange portion 41 to the through-hole 43 at the center thereof. A width of the dividing slot 42 is larger than the diameter of the rod 12, so when removing the junction member 4, the rod 12 can pass through the dividing slot 42.

Further, the cover 13, the junction member 4, and the top cap 5 are engaged with each other in a direction of rotation about an axis of those so as to be prevented from being rotated with respect to each other in the rotation direction.

With this construction, as shown in FIG. 4, the upper end of the stopper 31 protrudes upwards from an end portion of the cover 13 to constitute an engagement portion 31a, and on a part of the lower end of the top cap 5, an engagement portion 51 protruding downwards is formed. The engagement portion 31a and the engagement portion 51 engage with the dividing slot 42 of the junction member 4. In this case, the engagement portion 31a of the stopper 31 engages with a notch portion 42a on an outer peripheral side of the dividing slot 42, and the engagement portion 51 of the top cap 5 engages with a notch portion 42b on an inner peripheral side of the dividing slot 42.

For replacement or the like of the suspension spring 2, the cover 13, or the cam mechanism 3, removal of the junction member 4 is made possible.

In order to remove the junction member 4 from between the cover 13 and the top cap 5, the cover 13 is pushed down while the suspension spring 2 is compressed, thereby positioning the junction member 4 below the cushioning rubber 6.

In this state, the junction member 4 is moved toward the dividing slot 42 perpendicularly to the rod 12 (i.e., in a direction orthogonal to the rod 12). As a result, the engagement portion 31a and the engagement portion 51 are detached from the dividing slot 42 and the rod 12 passes through the dividing slot 42, thereby making it possible to remove the junction member 4 from the hydraulic shock absorber.

When the junction member 4 is removed, the cover 13 can move in an axial direction of the rod. In this case, the inner diameter of the cover 13 is larger than the outer diameter of the top cap 5, so the cover 13 can be pulled out upwards along the outer side of the top cap 5. After the cover 13 has been removed as described above, it is possible to replace the suspension spring 2 or the cap mechanism 3.

Figure 6:
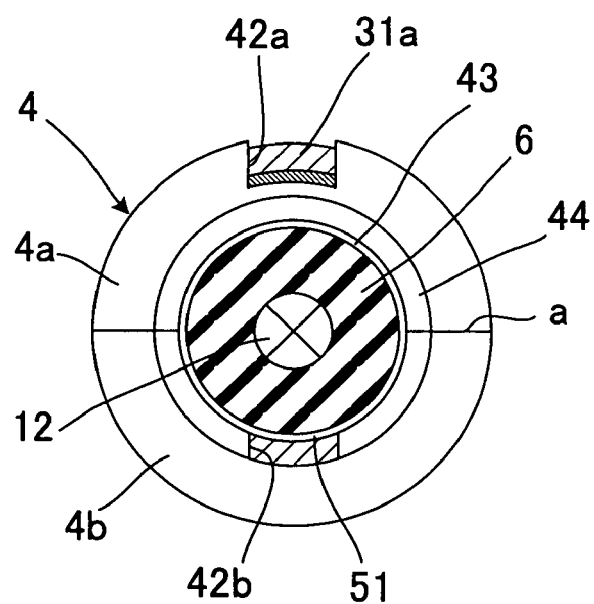
FIG. 6 is a plan view showing another example of the junction member.

The junction member 4 can be formed in a so-called divided manner as shown in FIG. 6.

In FIG. 6, the junction member 4 is divided into two by the diametrical cutting-plane line "a" passing an axis of the junction member 4 and is composed of divided members 4a and 4b.

The notch portion 42a on the outer peripheral side, engaging with the engagement portion 31, is formed in the flange portion 41 of one divided member 4a. The notch portion 42b on the inner peripheral side, engaging with the engagement portion 51, is formed in the bottom portion 44 of the other divided member 4b.

With this construction, in a case of removing the junction member 4 from between the cover 13 and the top cap 5, the cover 13 is pressed down such that the upper end of the cover 13 is located below the lower surface of the junction member 4, thereby making it possible to separate the divided members 4a and 4b to the left and right to easily remove the junction member 4.

Figure 7A:
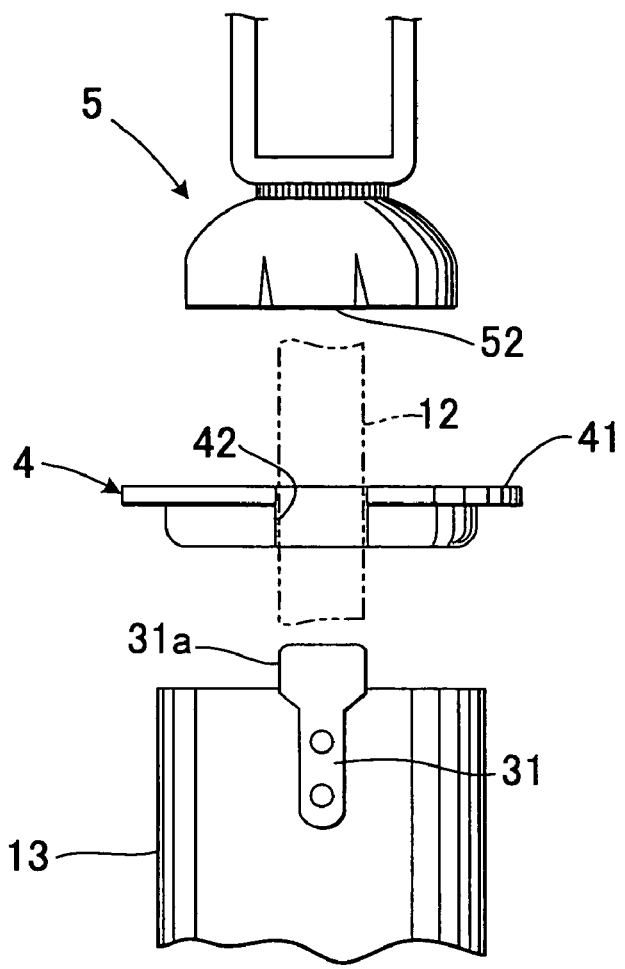
Figure 7B:
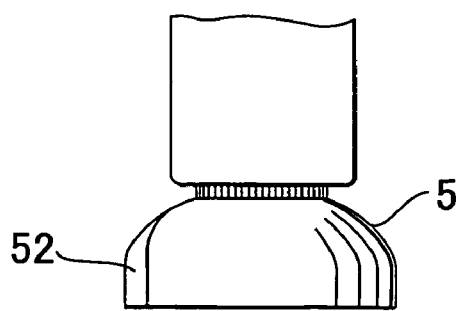

Next, FIG. 7 shows an example including a swelling portion 52 formed to protrude radially outwardly from the lower end of the top cap 5, in place of the engagement portion 51 formed to protrude from the lower end of the top cap 5.

The swelling portion 52 is formed by allowing a part of the outer periphery of the lower end of the top cap 5 to swell radially outwardly through press forming. The swelling portion 52 is formed such that a width thereof coincides with that of the notch portion 42b on the inner peripheral side of the dividing slot 42.

The swelling portion 52 is integrally formed through the press forming or the like in the above-mentioned manner, thereby making it possible to increase productivity and to reduce unit cost of the part.

In the hydraulic shock absorber formed as described above, a portion of the rod 12, protruding from the cylinder 11, is entirely covered with the cover 13, so an outer periphery of the rod 12 becomes resistant to adhesion of dirt or the like, thereby allowing the rod 12 to smoothly extend/retract in any case.

The cam mechanism 3 for the suspension spring 2 is arranged on the outer side of the cover 13, so an operation of adjusting the spring force can be easily performed from the outside. Further, the cam mechanism is provided to the upper portion of the shock absorber. Therefore, as compared to a case where the cam mechanism is provided to the lower portion of the shock absorber, it is resistant to adhesion of dirt or the like and to damage.

In the case, for example, where it is required to replace the suspension spring 2 or the cam mechanism 3 of the shock absorber, by removing the junction member 4 from between the cover 13 and the top cap 5, the cover 13 can be pulled out from above the top cap 5, thereby making it possible to facilitate replacement and repair of the suspension spring 2 or the cam mechanism 3. Thus, this construction provides excellent maintainability.

This invention is not limited to the embodiment described above, and it is needless to say that this invention includes various modifications and improvements within the scope of the technical principles of the invention.

What is claimed is:

1. A spring force adjusting device for a hydraulic shock absorber, comprising:
    a cylinder;
    a rod protruding from the cylinder so that the rod is free to extend and retract;
    a tube-shaped cover provided on an outside of the rod and having an inner diameter larger than an outer diameter of the cylinder;
    a suspension spring arranged on outer peripheries of the cylinder and the cover;
    a cam mechanism arranged on the outer periphery of the cover to adjust a spring force, the cam mechanism supporting one end of the suspension spring, being rotatable with respect to the cover, being engaged with the cover in an axial direction, and moving the one end of the suspension spring vertically according to a rotating position of the cam mechanism;
    a top cap mounted on a tip of the rod and having a diameter smaller than a diameter of the cover; and
    a junction member sandwiched between the top cap and the cover and arranged so that the junction member can be attached and detached in a direction orthogonal to the rod, an inner peripheral side of the junction member having a first notch portion, an outer peripheral side of the junction member having a second notch portion, such that the top cap engages with the first notch portion and the cover engages with the second notch portion,
    so as to prevent relative rotations of the top cap, the cover, and the junction member.

2. The spring force adjusting device according to claim 1, wherein the cam mechanism comprises
    a cam barrel, which is introduced onto the outer periphery of the cover, and has a cam surface and a spring seat which supports the one end of the suspension spring, the cam barrel being free to rotate, and
    a stopper fixed to the cover and engaging with the cam surface.

3. The spring force adjusting device according to claim 1, wherein the junction tubular shape having a shallow bottom portion provided with a through-hole at a center of the shallow bottom portion and a flange portion continuous with a periphery of the shallow bottom portion,
    wherein a lower end of the top cap abuts on the bottom portion, and an upper end of the cover abuts on the flange portion.

4. The spring force adjusting device according to claim 3, further comprising a first engagement portion mounted to the cover to engage with the second notch portion on the outer peripheral side, and a second engagement portion provided on the top cap to engage with the first notch portion on the inner peripheral side.

5. The spring force adjusting device according to claim 4, wherein the junction member is provided with an dividing slot cut in a radial direction from the flange portion to the through-hole, the dividing slot having a width larger than a diameter of the rod,
    wherein the dividing slot serves as both the second notch portion on the outer peripheral side, engaging with the first engagement portion, and the first notch portion on the inner peripheral side, engaging with the second engagement portion.

6. The spring force adjusting device according to claim 4, wherein the junction member is divided into two divided members by a diametrical cutting-plane line passing an axis of the junction member,
    wherein one divided member of the two divided members is provided with a notch portion on an outer peripheral side of the junction member, engaging with the first engagement portion, and another divided member of two divided members is provided with a notch portion on an inner peripheral side of the junction member, engaging with the second engagement portion.

* * * * *